United States Patent
Li

(10) Patent No.: US 12,067,346 B2
(45) Date of Patent: Aug. 20, 2024

(54) MACHINE LEARNING-POWERED FRAMEWORK TO TRANSFORM OVERLOADED TEXT DOCUMENTS

(71) Applicant: Microsoft Technology Licensing, LLC, Redmond, WA (US)

(72) Inventor: Ji Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/870,412

(22) Filed: Jul. 21, 2022

(65) Prior Publication Data

US 2022/0414315 A1 Dec. 29, 2022

Related U.S. Application Data

(63) Continuation of application No. 17/355,673, filed on Jun. 23, 2021, now Pat. No. 11,423,207.

(51) Int. Cl.
*G06F 40/114* (2020.01)
*G06F 40/106* (2020.01)
(Continued)

(52) U.S. Cl.
CPC .......... *G06F 40/114* (2020.01); *G06F 40/106* (2020.01); *G06F 40/151* (2020.01);
(Continued)

(58) Field of Classification Search
CPC .... G06F 40/114; G06F 40/106; G06F 40/151; G06F 40/186; G06F 18/2178;
(Continued)

(56) References Cited

U.S. PATENT DOCUMENTS 4,709,348 A * 11/1987 Horn ..................... G06F 40/114
715/205
9,009,092 B2 4/2015 Morris et al.
(Continued)

OTHER PUBLICATIONS

"International Search Report and Written Opinion Issued in PCT Patent Application No. PCT/US22/029514", Mailed Date: Sep. 1, 2022, 11 Pages.

*Primary Examiner* — Hope C Sheffield
(74) *Attorney, Agent, or Firm* — Schwegman Lundberg & Woessner, P.A.

(57) ABSTRACT

Systems and methods for providing a machine learning-powered framework to transform overloaded text documents is provided. The system generates a plurality of candidate templates offline. During runtime, the system accesses a text document and analyzes the text document to identify segmentation data. The segmentation data can indicate a plurality of segments derived from the text document. The system then accesses a plurality of candidate templates, whereby each candidate template comprises a plurality of pages having a different background element that shares a common theme. The plurality of candidate templates are ranked based on at least the segmentation data. The network then generates multiple presentation pages for each of a predetermined number of top ranked candidate templates by incorporating each of the plurality of segments into a corresponding page of the plurality of pages for each of the top ranked candidate templates. The multiple presentation pages are presented for each of the top ranked candidate templates as a recommendation.

20 Claims, 15 Drawing Sheets

(51) Int. Cl.
*G06F 40/151* (2020.01)
*G06F 40/186* (2020.01)
*G06N 20/00* (2019.01)
*G06F 18/21* (2023.01)
*G06V 10/25* (2022.01)
*G06V 10/46* (2022.01)
*G06V 10/75* (2022.01)
*G06V 30/413* (2022.01)
*G06V 30/422* (2022.01)

(52) U.S. Cl.
CPC ........... *G06F 40/186* (2020.01); *G06N 20/00* (2019.01); *G06F 18/2178* (2023.01); *G06V 10/25* (2022.01); *G06V 10/462* (2022.01); *G06V 10/751* (2022.01); *G06V 30/413* (2022.01); *G06V 30/422* (2022.01)

(58) Field of Classification Search
CPC ....... G06F 16/34; G06F 40/103; G06N 20/00; G06V 10/25; G06V 10/462; G06V 10/751; G06V 30/413; G06V 30/422
See application file for complete search history.

(56) References Cited

U.S. PATENT DOCUMENTS

| | | | |
|---|---|---|---|
| 9,953,011 B1* | 4/2018 | Anderson | G06F 40/106 |
| 11,423,207 B1 | 8/2022 | Li | |
| 2008/0155422 A1* | 6/2008 | Manico | G11B 27/031 |
| | | | 707/999.102 |
| 2011/0264705 A1* | 10/2011 | Diamond | G11B 27/034 |
| | | | 715/730 |
| 2011/0276874 A1* | 11/2011 | Dejean | G06F 40/174 |
| | | | 714/48 |
| 2012/0117473 A1* | 5/2012 | Han | G06F 3/04847 |
| | | | 715/723 |
| 2013/0205202 A1 | 8/2013 | Xiao et al. | |
| 2014/0098398 A1* | 4/2014 | Hobbs | G06F 3/1244 |
| | | | 358/1.15 |
| 2014/0215301 A1* | 7/2014 | Stone | G16H 10/60 |
| | | | 715/225 |
| 2015/0113372 A1 | 4/2015 | Flider | |
| 2018/0129634 A1 | 5/2018 | Sivaji et al. | |
| 2019/0325626 A1 | 10/2019 | Tao | |

\* cited by examiner

800

Intelligence: Designed to Amplify

1. Intelligence: Designed to Amplify
   a. The fusion of premium content and pro-active intelligence to help you create effortlessly beautiful presentations
2. Adapt to Context
   a. We all focus, filter, and consume information in unique ways. We have capabilities and limitations for tuning in and out information. These preferences and capabilities can rapidly change based on context.
   b. Because of that, how a person interacts with each feature or part of an experience will change. Can your system learn from how people interact to modify the way it communicates?
3. Enable to Adapt
   a. Personalized experiences are tailored to an individual and customizable features help customers feel empowered. Allow personalization of the color, type, image, and icons.
   b. Design an entire experience mindful of feedback, triggers, and alerts from the system and how a person can make the experience their own.

FIG. 8A

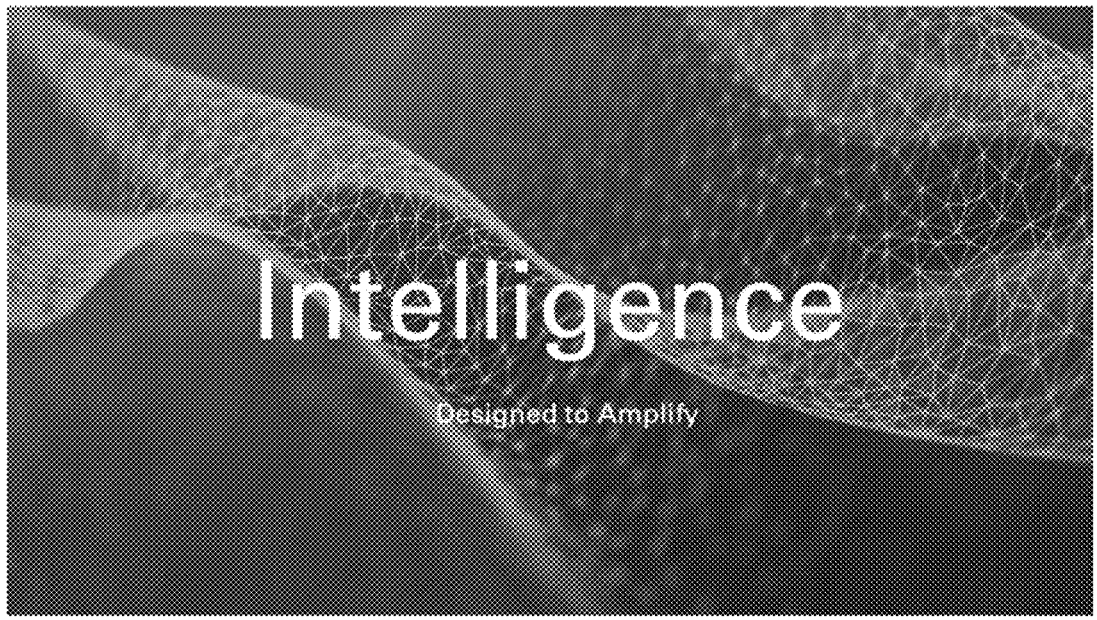

FIG. 8B

MACHINE LEARNING-POWERED FRAMEWORK TO TRANSFORM OVERLOADED TEXT DOCUMENTS

CROSS-REFERENCE TO RELATED APPLICATIONS

This application is a continuation of prior application Ser. No. 17/355,673, filed on Jun. 23, 2021, which is incorporated by reference herein in its entirety.

TECHNICAL FIELD

The subject matter disclosed herein generally relates to document presentations. Specifically, the present disclosure addresses systems and methods that use a machine learning-powered framework to transform overloaded text documents into multiple visually appealing segments with smooth morph transition.

BACKGROUND

Conventionally, a user can easily add lots of text into slides or word documents. However, it is time-consuming to break up the text into multiple segments and add seamless transitions with suitable background in order for an audience to more easily understand and remember content/message. While text is essential to deliver the message, smooth morph transition with proper background can make the presentation more engaging. While mature applications comprise many features that help to create video-like effects or smooth transitions, not many people are aware of such features or know how to use such features. To fully utilize these features, some professional art design and strategies may be needed.

BRIEF DESCRIPTION OF THE DRAWINGS

Some embodiments are illustrated by way of example and not limitation in the figures of the accompanying drawings.

FIG. 8A-FIG. 8E illustrate example multiple segments created from an overloaded text document using a template generated from an image, according to some example embodiments.

DETAILED DESCRIPTION

Figure 1:
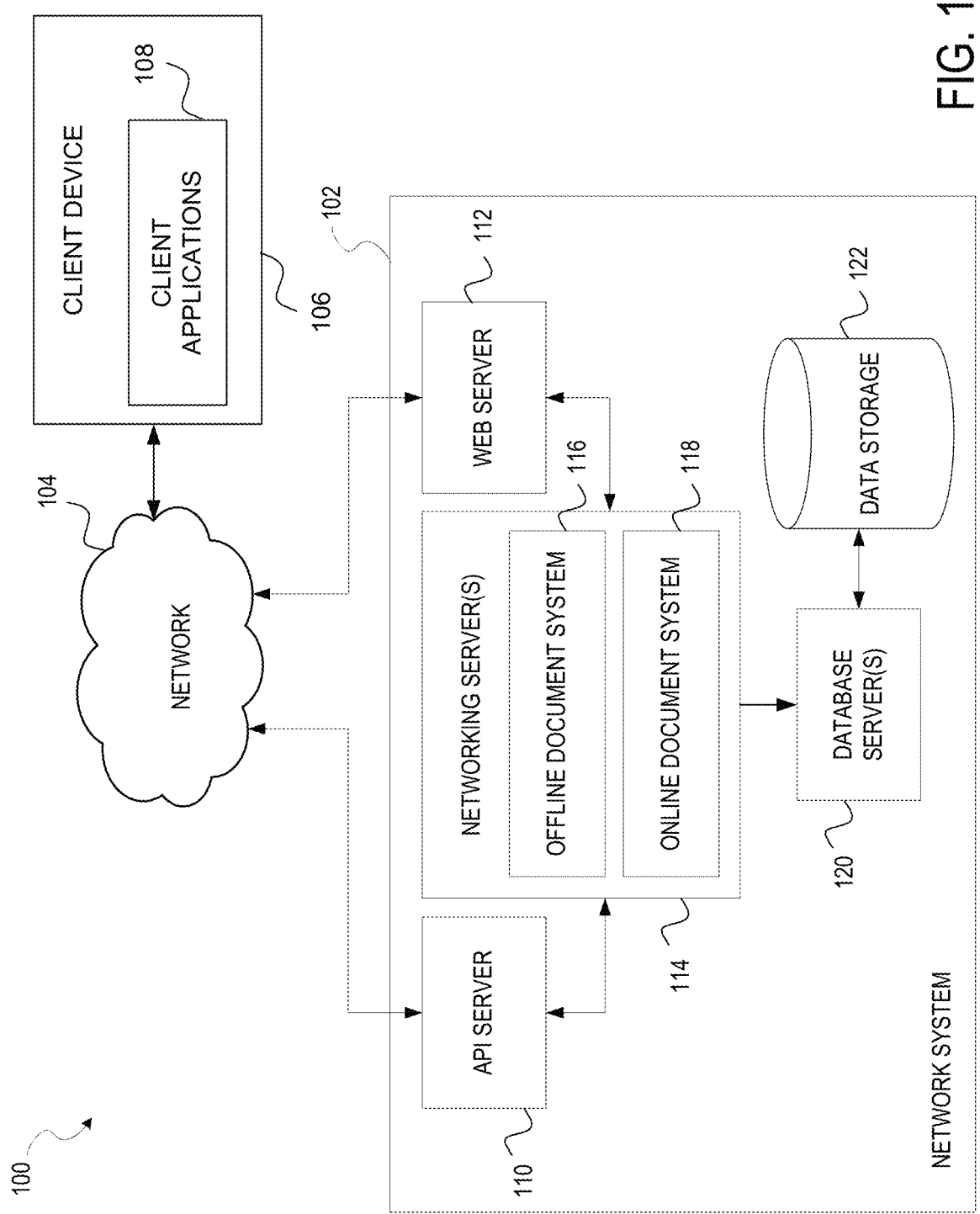
FIG. 1 is a diagram illustrating a network environment suitable for providing a machine learning-powered framework to transform overloaded text documents into multiple segments, in accordance with example embodiments, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

With the proliferation of work-from-home, video and video conferencing is heavily being used to convey information. Often times, users try to present too much information on a single text document such as a slide. As users add text to a slide, they may realize that there is too much text. In these situations, the user will need to create an additional slide, copy text to be moved to the additional side, delete that text from a current slide, and paste the copied text on the additional slide. Because this is time and resource consuming, the user may just choose to leave the overloaded text document alone.

Example embodiments transforms an overloaded "white wall" text document into smaller pieces of text with seamless transitions of content and having a background which makes it easier for a viewer to consume and stay engaged. During runtime, access to a data storage of transition templates (also referred to as "candidate templates") is provided to an online document system. The online document system uses machine-learning models to segment the overloaded text document into smaller parts and identify a number of segments that the text document will be split into. User preference can also be accessed. Using the segmentation information and the user preferences, candidate templates are ranked based on aesthetics. Top ranked templates (e.g., different pages/slides of each top ranked template) are then displayed to the user, for example, with the segments of the overloaded text document positioned thereon.

Designing a transition template may require lots of efforts from professional human designers. Additionally, viewers can be bored of a same few designs. Therefore, a low cost and efficient way to automatically generate such templates is needed. Such a system should be able to leverage user interactions and feedback to improve the templates. To address these issues, templates having different backgrounds are automatically generated by an offline document system that takes color, timing direction, and aesthetic assessment into consideration. In example embodiments, the generation of the templates is performed using machine-learning models.

Thus, example embodiments provide a machine learning-powered framework that generates templates and automatically transforms overloaded text documents into multiple visually appealing segments (e.g., pages or slides). Example embodiments utilize a plurality of machine-trained models to generate the templates offline and to analyze the content on the overloaded text document when online to determine how to segment the content on the overloaded text document and which candidate template(s) would work best. Additionally, a machine-trained model can be used to rank the candidate templates to identify a top number of candidate templates that will work best with the analyzed overloaded text document.

Accordingly, the present disclosure provides technical solutions that automatically, without human intervention, generate multiple visually appealing segments from an overloaded text document and provide those segments with smooth morph transition. As a result, one or more of the methodologies described herein facilitate solving the technical problem of overloaded text documents in presentations. As such, one or more of the methodologies described herein may obviate a need for certain efforts or computing resources that otherwise would be involved when users manually have to create multiple segments from an overloaded text document by copying, pasting, and rearranging slide components. As a result, resources used by one or more machines, databases, or devices (e.g., within the environment) may be reduced by the reduction of operations. Examples of such computing resources include processor cycles, network traffic, memory usage, data storage capacity, power consumption, network bandwidth, and cooling capacity.

FIG. 1 is a diagram illustrating a network environment 100 suitable for providing a machine learning-powered framework to transform overloaded text documents into multiple segments, in accordance with example embodiments. A network system 102 provides server-side functionality via a communication network 104 (e.g., the Internet, wireless network, cellular network, or a Wide Area Network (WAN)) to a client device 106 that includes a client application 108. In example embodiments, the network system 102 trains and uses machine learning models to generate transition templates. The network system 102 also trains and uses machine learning models to analyze content on overloaded text documents and ranks candidate templates based on compatibility with the analyzed overloaded text document and user preferences.

In example embodiments, the client device 106 is a device of a user of the network system 102 that wants to create a text document. The client device 106 includes client applications 108 which can be used to generate the text document. In some embodiments, the client applications 108 also comprise an online document system (or a portion of the online document system) that can apply machine-trained models to an overloaded text document and rank candidate templates that can be used to present the parts/segments of the overloaded text document, as will be discussed in more details below.

The client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an embodiment, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The client device 106 may comprise, but is not limited to, a smartphone, tablet, laptop, multi-processor systems, microprocessor-based or programmable consumer electronics, game consoles, set-top boxes, a server, or any other communication device that can access the network system 102. In some embodiments, the client device 106 comprises a display module (not shown) to display information (e.g., in the form of user interfaces).

Turning specifically to the network system 102, an application programing interface (API) server 110 and a web server 112 are coupled to, and provide programmatic and web interfaces respectively to, one or more networking servers 114. The networking server(s) 114 host an online system 116 and an offline system 118, each of which comprises a plurality of components, and which can be embodied as hardware, software, firmware, or any combination thereof.

The offline document system 116 is configured to automatically generate transition templates that comprises different backgrounds, colors, content placement locations, and morph effects. The offline document system 116 will be discussed in more detail in connection with FIG. 2 and FIG. 3 below.

The online document system 118 is configured to automatically generate multiple segments (e.g., multiple pages or slides) with smooth morph transition from a single overloaded text document (e.g., a single overloaded slide). In some embodiments, the online document system 118 is a cloud-based application that can be accessed by the client device 106. In some embodiments, one or more components of the online document system 118 (or a copy/version of one or more components) can be located at the client device 106 (e.g., as part of a client application 108). The online document system 118 will be discussed in more detail in connection with FIG. 4 below. For ease of discussion, example embodiments will be discussed herein for an overloaded text document that is a slide or page in a slide presentation.

The networking servers 114 are, in turn, coupled to one or more database servers 120 that facilitate access to one or more information storage repositories or data storage 122. In some embodiments, the data storage 122 is a storage device storing libraries of images or blueprint families that are used by the offline document system 116.

In example embodiments, any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Additionally, any number of client devices 106 may be embodied within the network environment 100. While only a single network system 102 is shown, alternative embodiments contemplate having more than one network system 102 to perform server operations discussed herein for the network system 102 (e.g., each localized to a particular region).

Figure 2A:
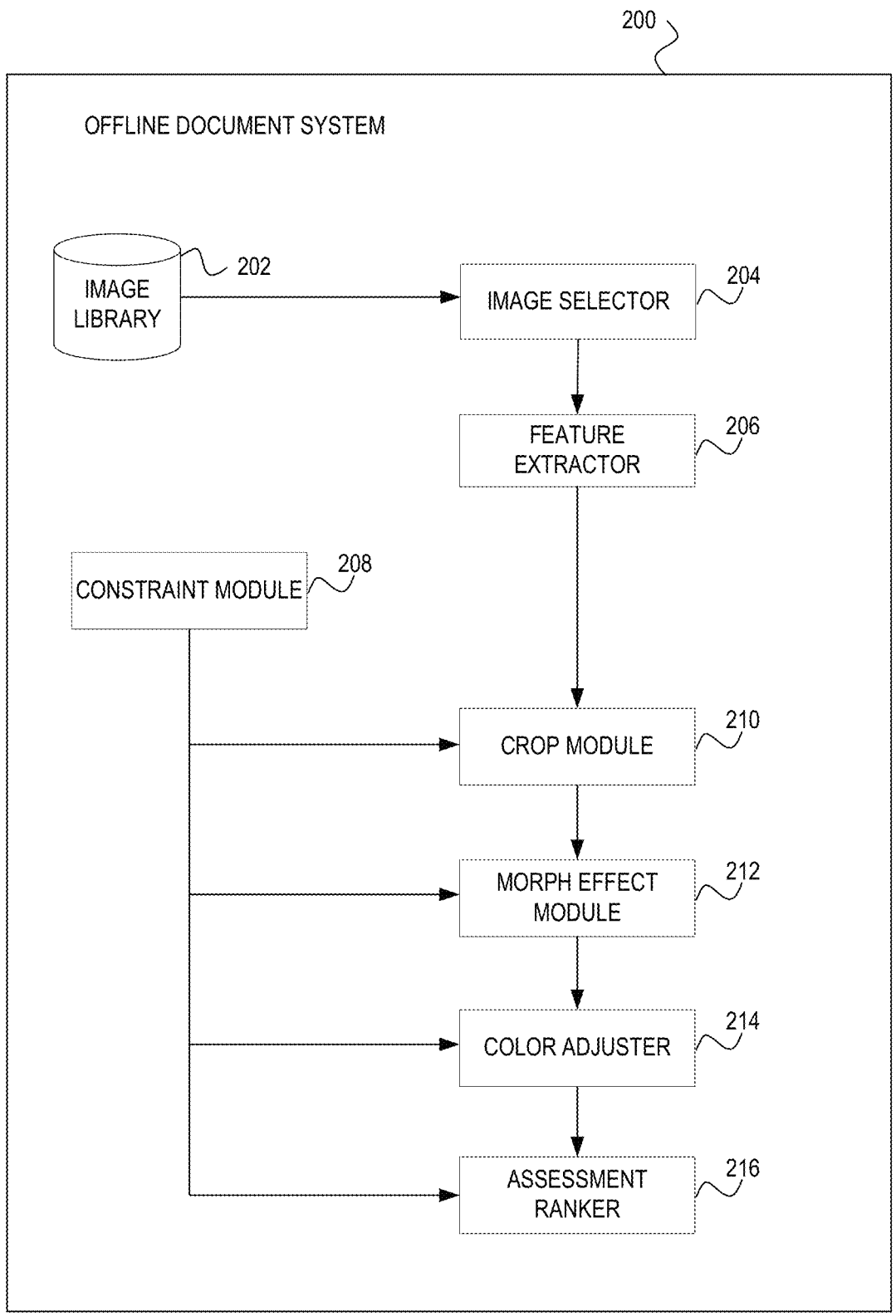
FIG. 2A is a block diagram illustrating components of an offline document system that generates templates used in transforming the overloaded text document using images, according to some example embodiments.

FIG. 2A is a block diagram illustrating components of an offline document system 200 that generates transition templates that can be used in transforming the overloaded text document using images, according to some example embodiments. The offline document system 200 may be the offline document system 116 of FIG. 1. In example embodiments, the offline document system 200 generates transition templates using a large background image or picture. In these embodiments, the proposed segmented slides just move around the large image. This creates a moving background but with some consistency. Accordingly, the offline document system 200 comprises an image library 202, an image selector 204, a feature extractor 206, a constraint module 208, a crop module 210, a morph effect module 212, a color adjuster 214, and an assessment ranker 216. While a particular communication structure is shown in FIG. 2A, alternative embodiments may configure the layout of the components of the offline document system 200 differently.

The image library 202 is a data storage device that stores a library of images that can be used to generate the transition templates. The images are high-resolution large size images that provide a background for the transition templates. While the image library 202 is shown being embodied within the offline document system 200, alternatively, the image library can be stored in the data storage 122.

The image selector 204 is configured to select an image from the image library 202 that will be used to generate a transition template. The selected image is then provided (e.g., transmitted) to the feature extractor 206.

The feature extractor 206 is configured to analyze the selected image and extract image feature embeddings. In some embodiments, the feature extractor 206 applies a feature model that is trained on a dataset of features from images. The extracted features can comprise, for example, shapes defined in terms of curves or boundaries between different image regions or specific structures in the image, such as points, edges, or objects. The extracted features can also include instance (e.g., human, animal) segments, properties (e.g., pose, species), colors, depth, and so forth.

The constraint module 208 is configured to manage design constraints or targets for the can templates. For example, design constraints can include a number of boxes; minimum or maximum size of each box; text size and length, duration of display, and/or a word range in each box on a template. Each box (also referred to herein as "cropping box") corresponds to a different background for a potential segmented page/slide. The design constraint can also indicate a number of movements and whether an overloaded text document should be divided into two, three, or more segmented slides. For example, if the design constraint is to be divided into two segmented slides, the offline document system 200 only needs to move a single box to a different location for the transition template, whereas for a split into three segmented slides, two movements of the single box is needed. Based on different combinations of the design constraints, different transition templates may be generated. For instance, if the text is very long, the transition template may have a larger box and be moved to a location that may be different than if the text is not as long.

The crop module 210 is configured to manage the cropping boxes. The cropping boxes "crop" a portion of the image to be used as background for a segmented slide In example embodiment, the crop module 210 applies a (machine-learned) cropping model to propose one or more candidate sets of cropping boxes on top of the image. Thus, more than one candidate template (e.g., each having a different candidate set of cropping boxes) can be generated from a single image. In example embodiments, the cropping model has been trained on previous data sets of cropping boxes and their locations on slides.

Figure 2B:
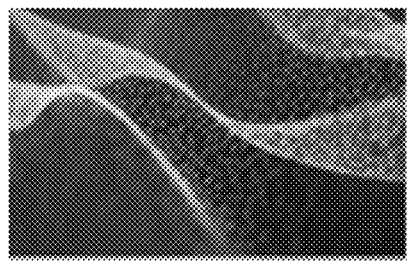
FIG. 2B illustrates an example candidate set of cropping boxes for an image template.
Figure 2B:
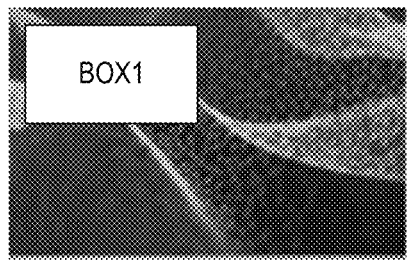
Figure 2B:
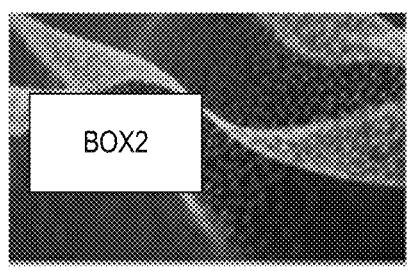
Figure 2B:
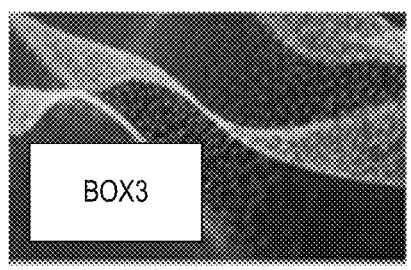

Referring to FIG. 2B, an example candidate set of cropping boxes for a transition template is shown. In this example, the original large image is shown at the top of FIG. 2B. A first cropping box (box1) is positioned in a top-left corner. A next cropping box (box2) is positioned downward from box1 and a third cropping box (box3) is positioned below box2. Alternative candidate sets may move cropping box 2 and 3 to the right, diagonally downward and to the right, randomly, or in any other direction, for example.

Referring back to FIG. 2A, the morph effect module 212 is configured to manage effects applied to the candidate set. In some embodiment, the morph effect module 212 applies a machine-trained morphing model to control effect details such as direction of a transition and timing for the transition effect (e.g., 0.5 seconds) for each candidate set. In some embodiments, the morph effect module 212 can, alternatively or in addition to the morphing model, use a rule-based lookup table to control effect details. For example, a rule-based signal can control the timing of transitions or effect options. In some embodiments, user preferences (or user history) can also be considered by the morph effect module 212.

The color adjuster 214 is configured to manage color effects. For example, to make a design smoother, another layer of color adjustment can be added by the color adjuster 214 by positioning color gradient layers on top of each cropping box. This results in a color variation from the original image. In various embodiments, the color adjuster 214 is optional.

The assessment ranker 216 is configured to rank the candidate template(s) derived from the candidate set(s) of cropping boxes. With the proposed image, color (or color adjustment), morph flow candidates, an aesthetic assessment model is applied by the assessment ranker 216 to rank the candidate templates. The aesthetic assessment model may be a machine-trained model that is trained on a dataset of human evaluated inputs and beauty scores (e.g., which ones did humans prefer) as well as user feedback from interaction with the data (e.g., the segmented slides). The top candidates are identified and stored for use by the online document system 118.

In various embodiments, the assessment ranker 216 may delay performing the ranking until a particular condition is met. For example, the assessment ranker 216 can wait until a predetermined number of candidate templates have been generated before performing ranking.

Figure 3A:
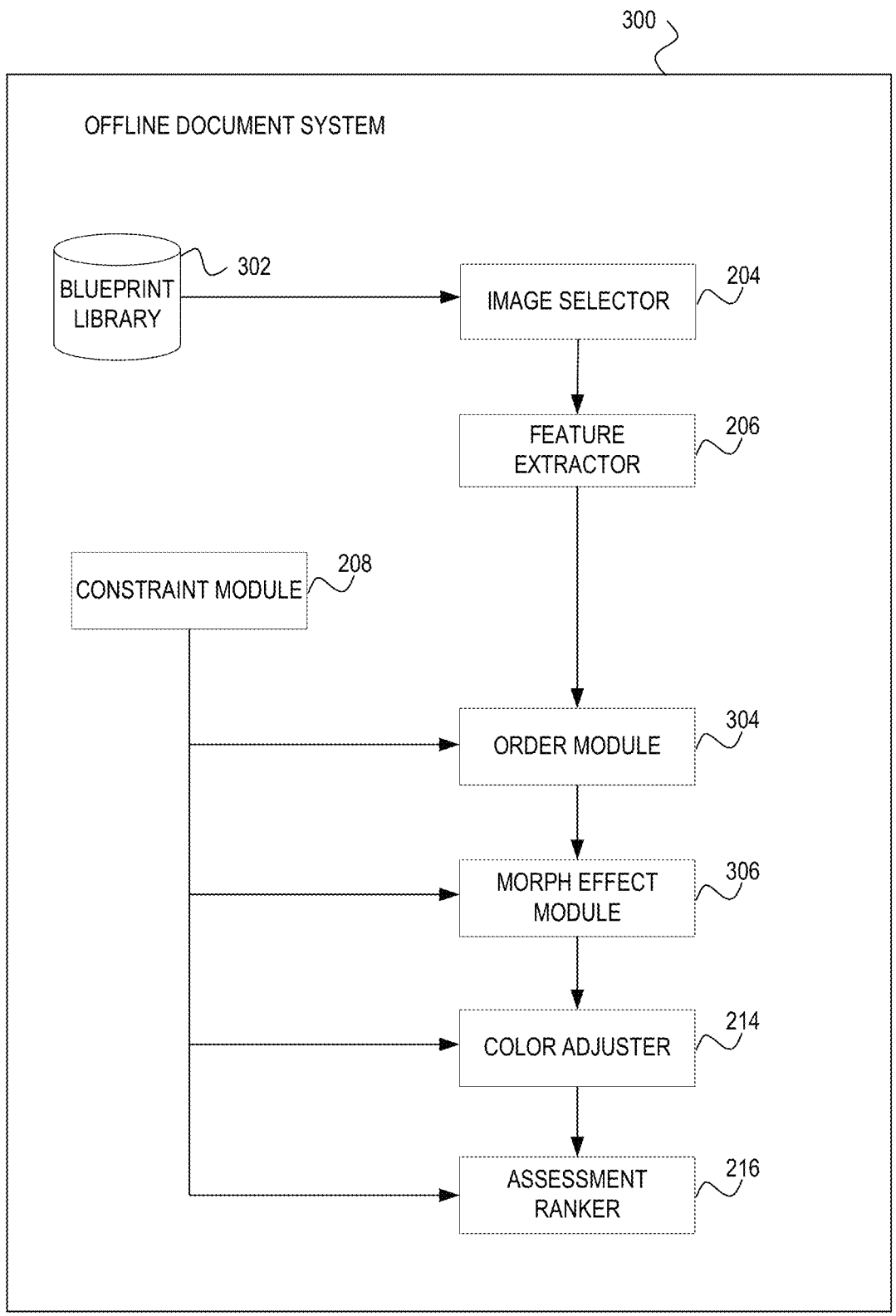
FIG. 3A is a block diagram illustrating components of a further offline document system that generates templates using blueprints, according to some example embodiments.

FIG. 3A is a block diagram illustrating components of a further offline document system 300 that generates templates using "blueprints," according to some example embodiments. Many of the components of the offline document system 300 are the same as for the offline document system 200 of FIG. 2 (and are labeled the same). In some embodiments, the offline document systems 200 and 300 can be combined into a single offline document system that share the common components. Additionally, while a particular communication structure is shown in FIG. 2A, alternative embodiments may configure the layout of the components of the offline document system 200 differently.

Instead of using a large image, the embodiment of FIG. 3A uses a blueprint family, which comprises a series of background images that share a common style (e.g., shapes, colors, themes). Objects within a blueprint family can move and colors can slightly change. A location where text is located can also be different within the blueprint family. Thus, the offline document system 300 comprises a blueprint library 302 that stores the blueprint families.

The image selector 204 selects a blueprint family from the blueprint library and provides it to the feature extractor 206, which extracts image embeddings from the blueprint family in a similar manner as in the embodiment of FIG. 2A. Similarly, the constraint module 208 manages the design constraints that will be applied.

Figure 3B:
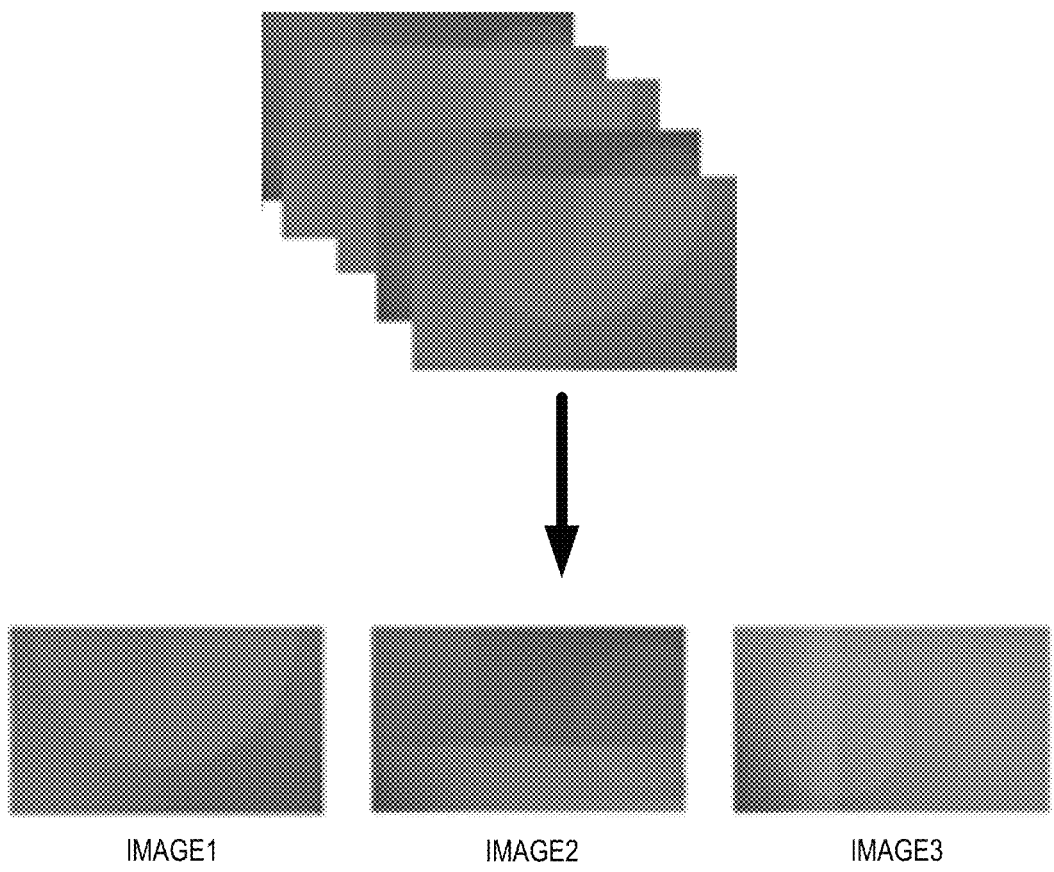
FIG. 3B illustrates an example of the generation of an example candidate from a blueprint family.

An order module 304 is configured to propose one or more candidates from the blueprint family and an order for the candidates. In example embodiments, the order module 304 applies a machine-trained ordering model, which proposes the candidates, whereby each candidate is a subset of the blueprint family in a particular order. Referring to FIG. 3B, generation of an example candidate is shown. Here, the selected blueprint family is shown at the top of FIG. 3B. Applying the ordering model and considering the design constraints (e.g., need to split into three slides), three background images are selected from the blueprint family: image1, image2, and image3. Together, the selected images form a candidate.

Referring back to FIG. 3A, a morph effect module 306 controls transitions for the images of the candidate. In example embodiments, the morph effect module 306 applies a simple machine-trained model or heuristics to control the effects timing and details.

Similar to the offline document system 200 of FIG. 2A, the optional color adjuster 214 can add one or more color adjustment layers to generate variations and color transition effects for each candidate. Additionally, the assessment ranker 216 applies the aesthetic assessment model to rank the candidates. The top candidates are identified and stored for use by the online document system 118.

While two different offline document systems 200 and 300 are shown, further embodiments contemplate other methods and systems to generate the candidates for use during runtime (e.g., by the online document system 118). The further embodiments an adjust one or more of the machine-trained models or adjust the technology to support the generation of the candidates in a slightly different manner.

Figure 4:
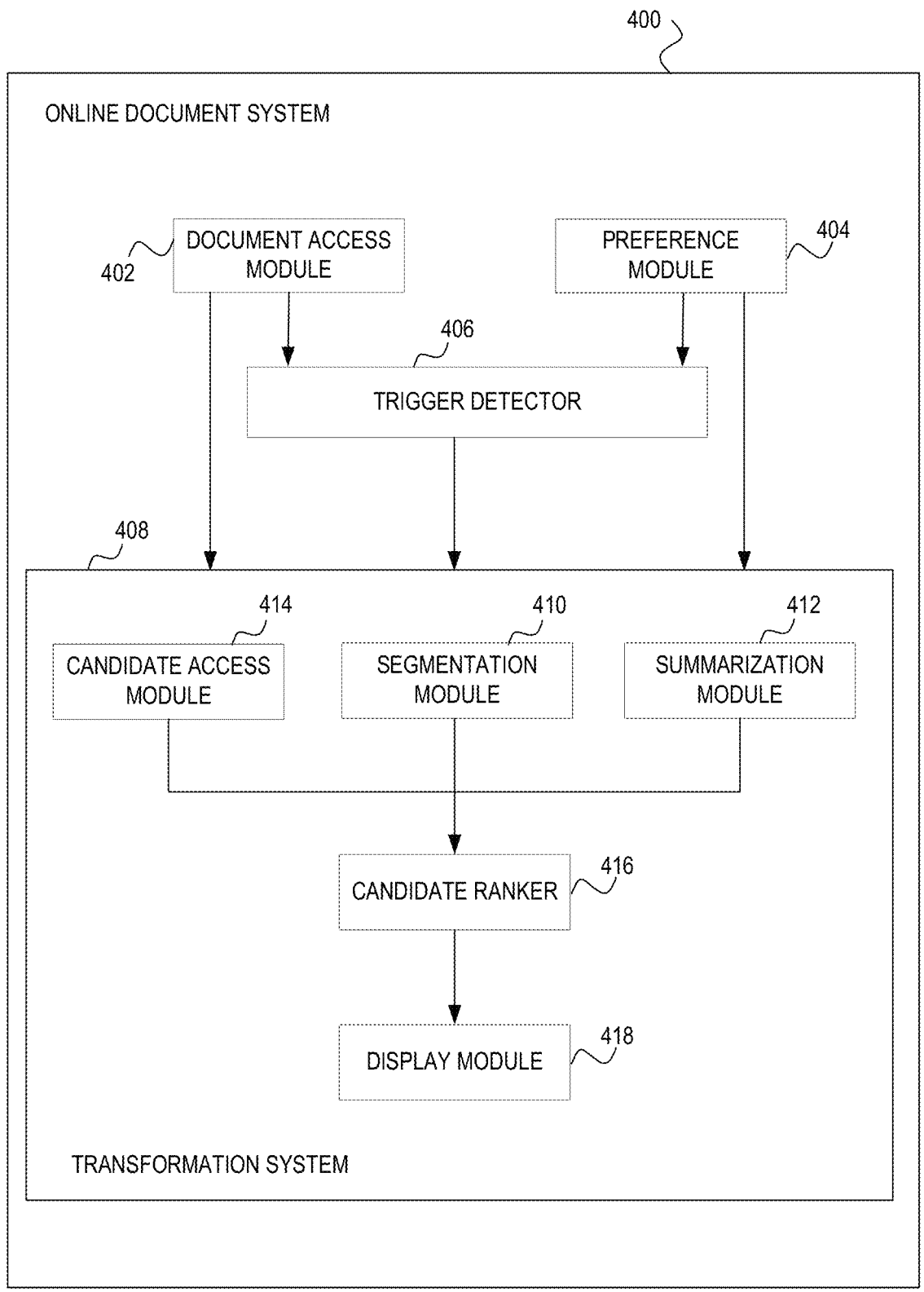
FIG. 4 is a block diagram illustrating components of an online document system that transforms the overloaded text document into the multiple segments or slides, according to some example embodiments.

Referring now to FIG. 4, a block diagram illustrating components of an online document system 400 that automatically transforms an overloaded text document into multiple segments or slides is shown, according to some example embodiments. In some embodiments, the online document system 400 is a cloud-based application on the network system 102 (e.g., the online document system 118) that can be accessed by the client device 106. In some embodiments, one or more components of the online document system 400 (or a copy/version of one or more components) can be located at the client device 106 (e.g., as part of a client application 108). It is noted that the online document system 400 is a lightweight system comprising just a few components.

During runtime, a document access module 402 accesses (e.g., obtains, receives) the overloaded text document (or user inputs that generate the overloaded text document). In one embodiment the document access module 402 may be or is in communication with a presentation application (e.g., the client application 108) that is used to generate the overloaded text document.

Similar, a preference module 404 accesses (e.g., obtains, receives, retrieves) user history and/or user preferences. The user history or user preferences can be accessed from a user profile associated with the presentation application or the online document system 400. The user history and user preferences can indicate, for example, whether the user generally wants to have their overloaded text documents split, preferred colors, and/or preferred themes or styles. The preference module 404 also accesses features, such as client endpoint (e.g., Mac, Windows, Web, iOS, Android), time of day, location, and so forth. In one embodiment, a personalizer model is trained with the user history and these features. The user may prefer different designs for different cases. For example, the user's preference for Monday morning using a Windows client may be different from a Saturday night using a phone client. Thus, the personalizer model can learn from the user history and the features and apply these user preferences downstream.

The overloaded text document and the preferences (e.g., user history, user preferences, and features) are provided to a trigger detector 406. In example embodiments, the trigger detector 406 determines whether to trigger the one-to-many flow (e.g., whether to split the overloaded text document into multiple segments, pages, or slides). Because the online document system 400 only wants to split very text-heavy slides, the trigger detector 406 can determine if a threshold amount (e.g., transgresses a predetermined threshold) of text is located on the text document. Additionally, user preferences may indicate the user does not want their text documents altered or only altered for certain situations. By applying this gating logic, the online document system 400 prevents triggering operations for cases that are not suitable for generating multiple slides, which has the technical effect of saving some computational resources.

If the trigger detector 406 determines that the text document should be split into segments, then the trigger detector 406 triggers a transformation system 408 to perform operations to segment the overloaded text document. Either the trigger detector 406 or a combination of the document access module 402 and preference module 404 provides the transformation system 408 with the overloaded text document and the preferences/features.

A segmentation module 410 is configured to analyze the overloaded text document to determine segmentation information. In example embodiments, the segmentation module 410 applies a segmentation model that is trained on previous segmentation datasets. In various embodiments, the segmentation module 410 analyzes for structure signals in the text document, such as, for example bullet points, numbering, end of paragraph, bullet level, new line, and period symbol, to determine the segments. The segmentation module 410 may also look for contextual information like transition and end of point. The segmentation module 410 may also identify the number of words in each segment. Thus, after operations of the segmentation module 410, the online document system 400 has knowledge of the number of segments and the number of words in each segment. The number of segments will indicate the number of segmented slides or pages will be created from the text document.

The summarization module 412 applies extractive summarization techniques to extract key parts as a title of each segment. In some embodiments, the summarization module 412 applies a summarization model that is trained on previous summarization datasets. In some embodiments, the summarization module 412 is optional.

A candidate access module 414 accesses the candidates from a data store. The candidates can include the candidates generated by the offline document system 300 and/or 400. In various embodiments, the candidates will each fulfill different sets of constraints. For example, some candidates are only for splitting into two slides, while others are for three slides. In another example, some candidates are only good for under a predetermined number of words (e.g., 20 words), while other are good for more numbers of words.

With all the candidates, user input segments (e.g., the segments from the text document), user preferences, other features, and constraints (e.g., number of slides to be created, number of text boxes in one slide) a candidate ranker 416 ranks the candidates to determine the best candidates for use in segmentation of the overloaded text document. In example embodiments, the candidate ranker 416 applies a ranking model trained on a dataset of human evaluated inputs and scores (e.g., which ones did humans prefer).

The top candidates will be applied if the ranking model is confident enough (e.g., transgresses a confidence threshold). For example, if a model suggested candidate can have a confidence from 0.0-1.0 and a threshold is set to 0.2, then a suggested candidate's confidence score of less than 0.2, results in the candidate not being suggested. Thus, the higher the threshold, the less candidates that may be shown. In example embodiments, the confidence score is automatically calculated by the ranking model (e.g., neural network or other equivalent model). In some embodiments, a display module 418 applies the top candidates (e.g., the top three) to the segments of the text document to generate the segmented slides (or candidate slide set or presentation pages). A title associated with each slide may be based on operations of the summarization module 412. The candidate slide sets are then displayed to the user for review. The user can choose to accept one of the candidate slide sets or reject them all. These acceptance or rejection is recorded as feedback and used to adjust preferences and train the various models used in generating the templates (e.g., the aesthetic assessment model used by the offline document system 200 or 300) and selecting the candidates (e.g., the ranker and detector model used by the online document system 400).

Figure 5:
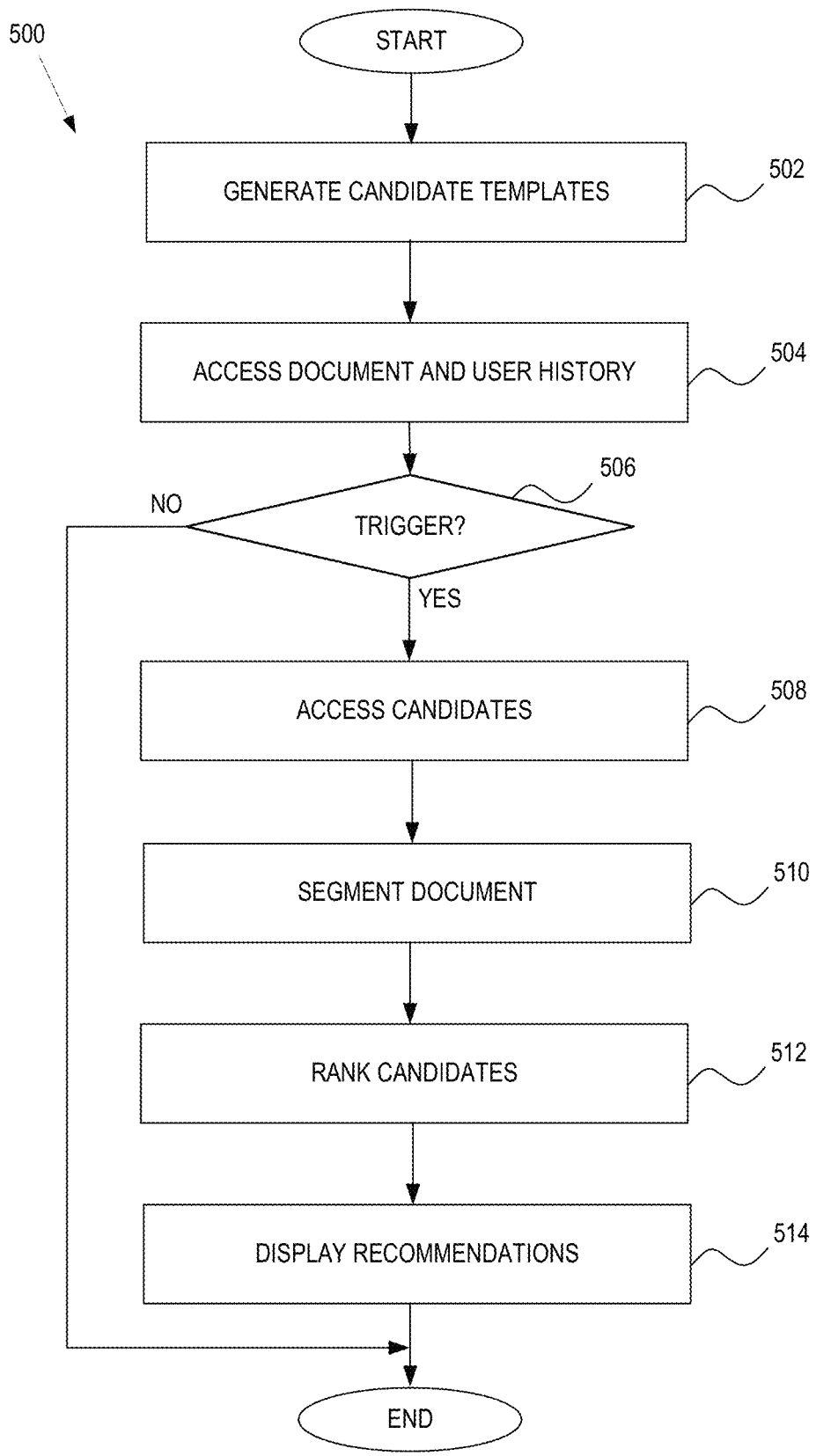
FIG. 5 is a flowchart illustrating operations of a method for transforming the overloaded text document into the multiple segments or slides, according to some example embodiments.

FIG. 5 is a flowchart illustrating operations of a method 500 for transforming the overloaded text document into multiple segments, according to some example embodiments. Operations in the method 500 may be performed by the offline document system 116, 200, and/or 300 and the online document system 118 and/or 400, using components described above with respect to FIG. 1 to FIG. 4. Accordingly, the method 500 is described by way of example with reference to these systems. However, it shall be appreciated that at least some of the operations of the method 500 may be deployed on various other hardware configurations or be performed by similar components residing elsewhere in the network environment 100. Therefore, the method 500 is not intended to be limited to the offline document system 116, 200, and/or 300 and the online document system 118 and/or 400.

In operation 502, the offline document systems 116, 200, and/or 300 generate candidate templates that can be used by the online document system 118 and/or 400 during runtime. Operation 502 will be discussed in more detail in connection with FIG. 6 and FIG. 7 below.

In operation 504, the document access module 402 accesses the text document. In one embodiment the document access module 402 may be, or is in communication with, a presentation application (e.g., the client application 108) that is used to generate the overloaded text document.

In operation 504, the preference module 404 accesses user history along with user preferences. The user history or user preferences can be accessed from a user profile associated with the presentation application or the online document system 400. The user history and user preferences can indicate, for example, whether the user generally wants to have their overloaded text documents split, preferred colors, and/or preferred themes or styles.

In operation 506, a determination is made, by the trigger detector 406, whether to trigger the generation of a plurality of segmented slides. Because only very text-heavy slides should be split into multiple segments or slides, the trigger detector 406 determines, in one embodiment, if a threshold amount of text (e.g., transgresses a predetermined threshold) is located on the text document. Additionally, user preferences may indicate, for example, that the user does not want their text documents altered or only altered for certain situations. If a determination is made not to trigger the generation, then the method 500 ends.

However, if a determination is made to trigger the generation, then the method 500 proceeds to operation 508 where candidates (e.g., candidate templates) are accessed from a data storage by the candidate access module 414. The candidate templates can include the candidate templates generated by the offline document system 300 and/or 400. The candidate templates may each fulfill different constraints and preferences.

In operation 510, the text document is analyzed by the segmentation module 410. In some embodiments, the segmentation module 410 segments the original overloaded text document into appropriate segments by apply a segmentation model, which uses natural language processing. For instance, the segmentation module 410 may determine context associated with the text document and/or use natural language processing to identify, for example, a change in context or topic, which may signal a different segment. The segmentation module 410 may also identify the number of words in each segment.

In operation 512, the candidates are ranked by the candidate ranker 416. Based on the candidates, segmentation data including the user input segments (e.g., the segments from the text document), user preferences, and other features, the candidate ranker 416 ranks the candidates to determine the best candidates for user in segmentation of the overloaded text document.

In operation 514, top candidate slide sets are generated and displayed as recommendations by the display module 418. In some embodiments, the display module 408 applies the top candidates (e.g., the top three) to the segments of the text document to generate the candidate slide sets. The candidate slide sets are then displayed to the user for review.

It is noted that the operations of the method 500 can be performed in a different order and that one or more of the operations can be optional. For example, the text document can be segmented (operation 510) before, during, or concurrent with accessing the candidates (operation 508).

Figure 6:
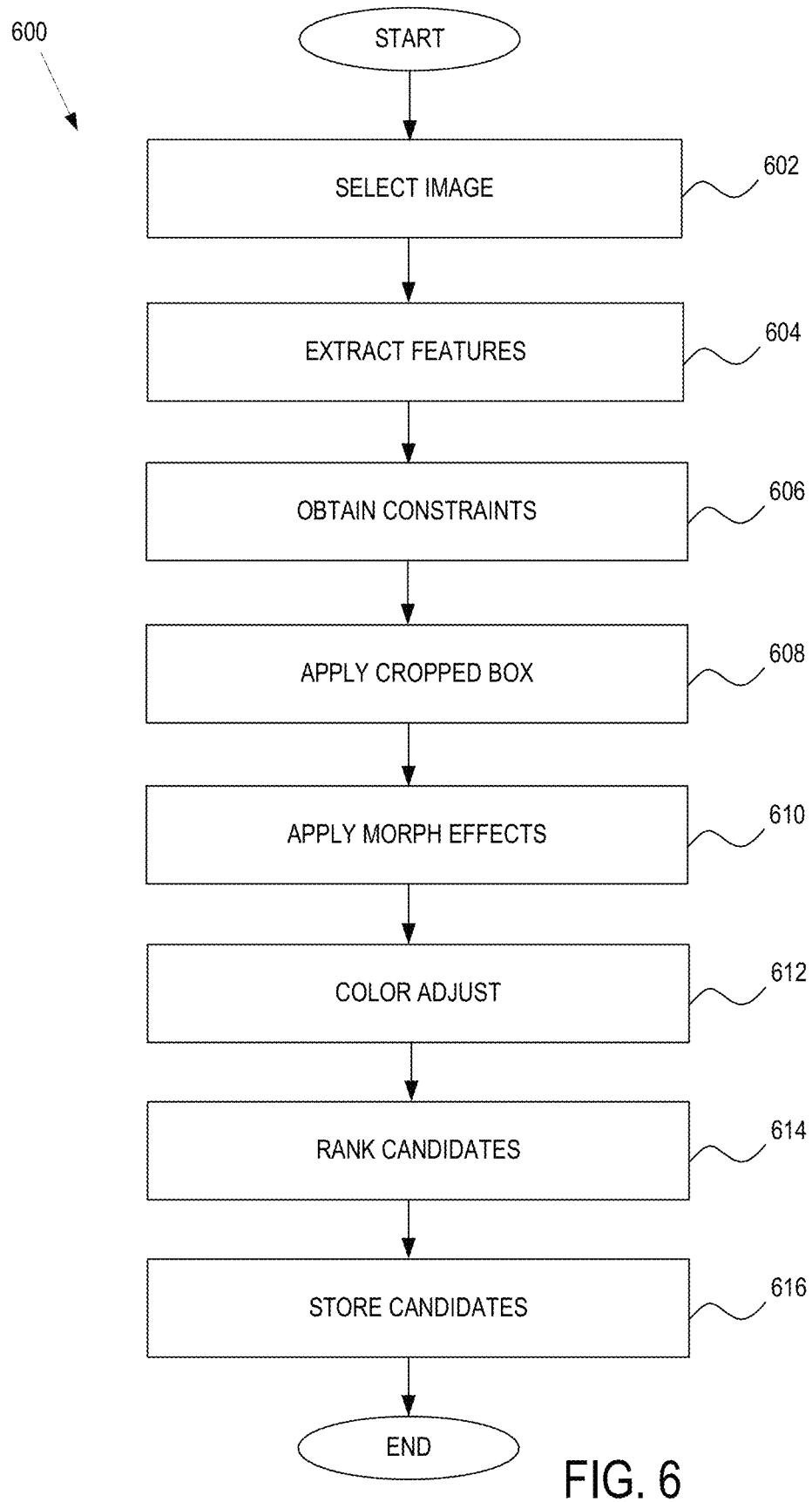
FIG. 6 is a flowchart illustrating operations of a method for generating templates used in transforming the overloaded text document, according to some example embodiments.

FIG. 6 is a flowchart illustrating operations of a method 600 (e.g., operation 502) for generating templates used in transforming the overloaded text document, according to some example embodiments. Operations in the method 600 may be performed by the offline document system 200, using components described above with respect to FIG. 2A. Accordingly, the method 600 is described by way of example with reference to the offline document system 200. However, it shall be appreciated that at least some of the operations of the method 600 may be deployed on various other hardware configurations or be performed by similar components residing elsewhere in the network environment 100. Therefore, the method 600 is not intended to be limited to the offline document system 200.

In operation 602, the image selector 204 selects an image from the image library 202 that will be used to generate one or more transition templates. The images are high-resolution large size images that provide a background for the transition templates.

In operation 604, the feature extractor 206 extracts features from the selected image. The extracted features can comprise, for example, shapes defined in terms of curves or boundaries between different image regions or specific structures in the image, such as points, edges, or objects.

In operation 606, the constraint module 208 obtains design constraints or targets for the transition templates. For example, design constraints can include a number of boxes; minimum or maximum size of each box; text size and length, duration of display, and/or word range in each box on a template. The design constraint can also indicate a number of movements and whether an overloaded text document should be divided into two, three, or more segmented slides.

In operation 608, cropping boxes are applied by the crop module 210. In example embodiment, the crop module 210 applies a (machine-learned) cropping model to propose one or more candidate sets of cropping boxes on top of the image. Thus, more than one candidate template (e.g., each having a different candidate set of cropping boxes) can be generated from a single image.

In operation 610, morph effects are applied by the morph effect module 212. In some embodiment, the morph effect module 212 controls effect details such as direction of a transition and timing for the transition effect (e.g., 0.5 seconds) for each candidate template.

In operation 612, the color adjuster 214 adjusts the color effects. For example, a layer of color adjustment can be added by positioning color gradient layers on top of each box. This results in a color variation from the original image. Operation 612 can be optional.

In operation 614, the candidate sets are ranked by the assessment ranker 216 using the selected image, color (or color adjustment), morph effects by applying a machine-learned assessment model. The top candidates are identified and stored in operation 616 to a data store for use by the online document system 118 during runtime.

Figure 7:
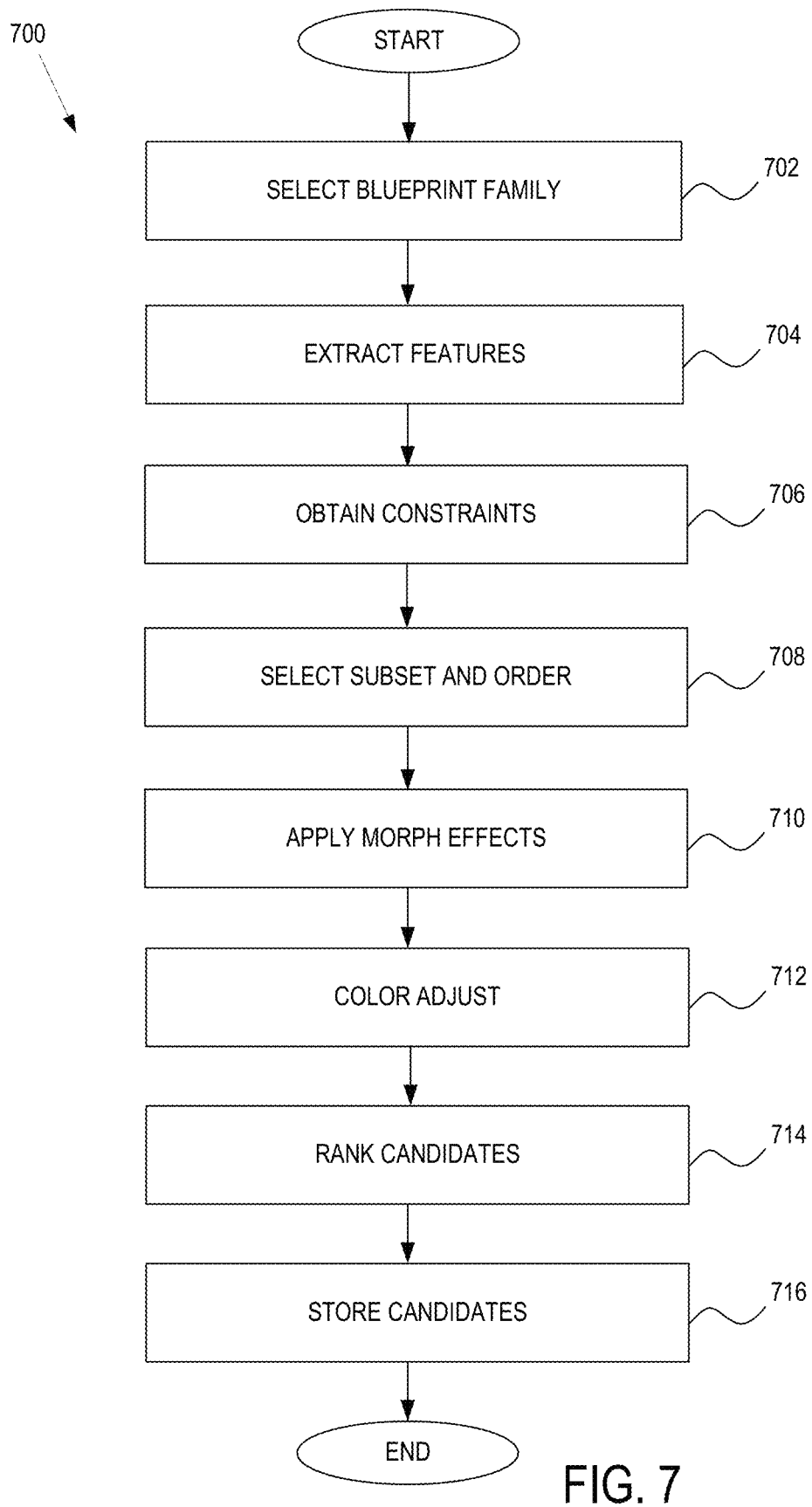
FIG. 7 is a flowchart illustrating operations of another method for generating templates used in transforming the overloaded text document, according to some example embodiments.

FIG. 7 is a flowchart illustrating operations of another method 700 (e.g., operation 502) for generating templates used in transforming the overloaded text document using blueprint families, according to some example embodiments. Operations in the method 700 may be performed by the offline document system 300, using components described above with respect to FIG. 3A. Accordingly, the method 700 is described by way of example with reference to the offline document system 300. However, it shall be appreciated that at least some of the operations of the method 700 may be deployed on various other hardware configurations or be performed by similar components residing elsewhere in the network environment 100. Therefore, the method 700 is not intended to be limited to the offline document system 300.

In operation 702, the image selector 204 selects a blueprint family from a blueprint library 302. Each blueprint family is a family or series of images that share a common style (e.g., shapes, colors, themes). Objects within a blueprint family can move and colors can slightly change.

In operation 704, the feature extractor 206 extracts image embeddings from the selected blueprint family. This operation is similar to operation 604 discussed above.

In operation 706, the constraint module 208 obtains design constraints that will be applied by the ranker. This operation is similar to operation 606 discussed above.

In operation 708, a subset of the selected blueprint family is selected by the order module 304. The order module 304 also determines an order for the subset of the selected blueprint family.

In operation 710, morph effects are applied by the morph effect module 306, which controls transitions for the candidate subset. In example embodiments, the morph effect module 306 applies a simple machine-trained model or heuristics to control the effects timing and details.

In operation 712, color is adjusted by the color adjuster 214, which can add one or more color adjustment layers to generate variations and color transition effects for each candidate subset. Operation 712 can be optional.

In operation 714, the candidate subsets are ranked. In example embodiments, the assessment ranker 216 applies the aesthetic assessment model to rank the candidate subsets. The top candidates are identified and stored, in operation 716, to a data store for use by the online document system 118 during runtime.

Figure 8C:
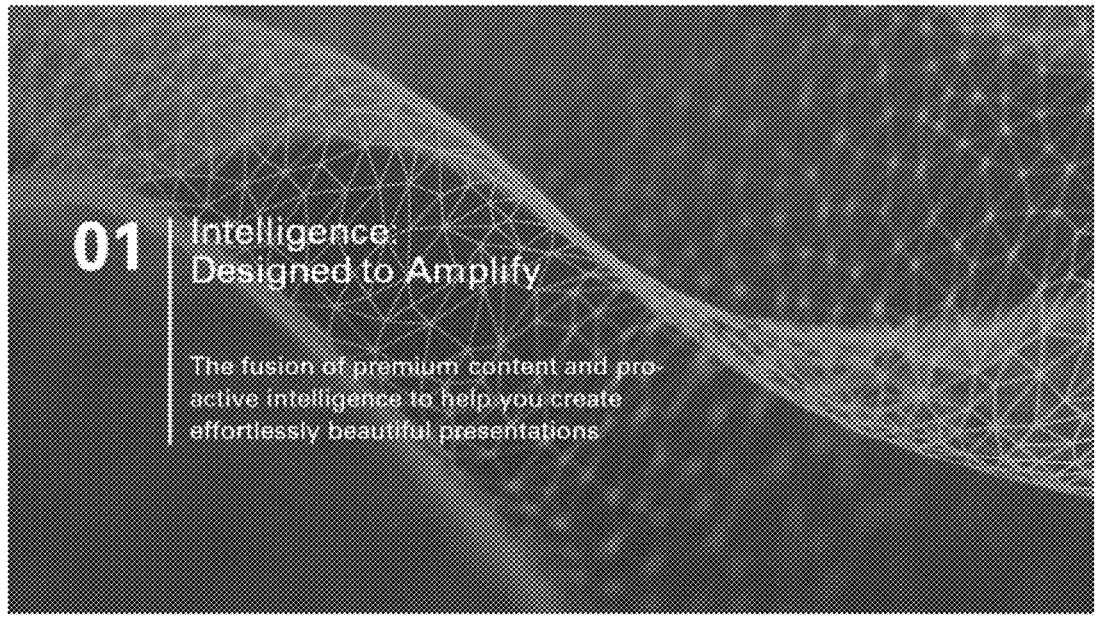

FIG. 8A-FIG. 8E illustrate example multiple segments generated from an overloaded text document using a candidate template generated from an image, according to some example embodiments. FIG. 8A shows an overloaded text document 800. As shown, the text document 800 includes a lot of text in small font, which may be difficult for a viewer to read through.

Applying the operations of the online document system 118 and/or 400, results in the text document 800 being automatically split into four segments or segmented slides. The summarization module 412 detects a title "Intelligence: Designed to Amplify." As such, this title is segmented into a first slide shown in FIG. 8B.

Figure 8D:
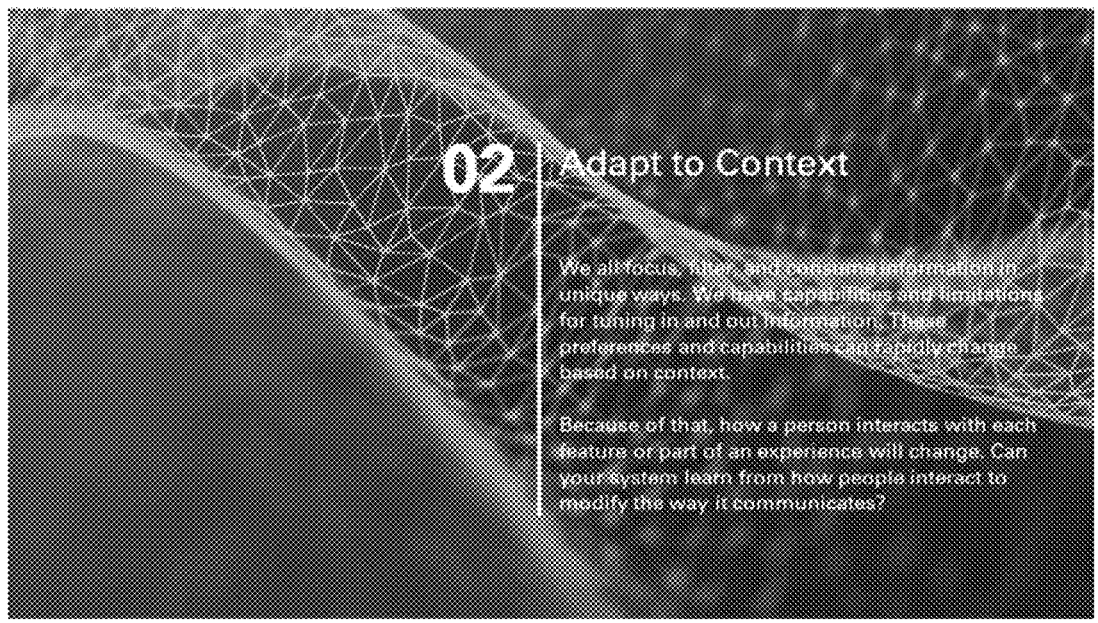
Figure 8E:
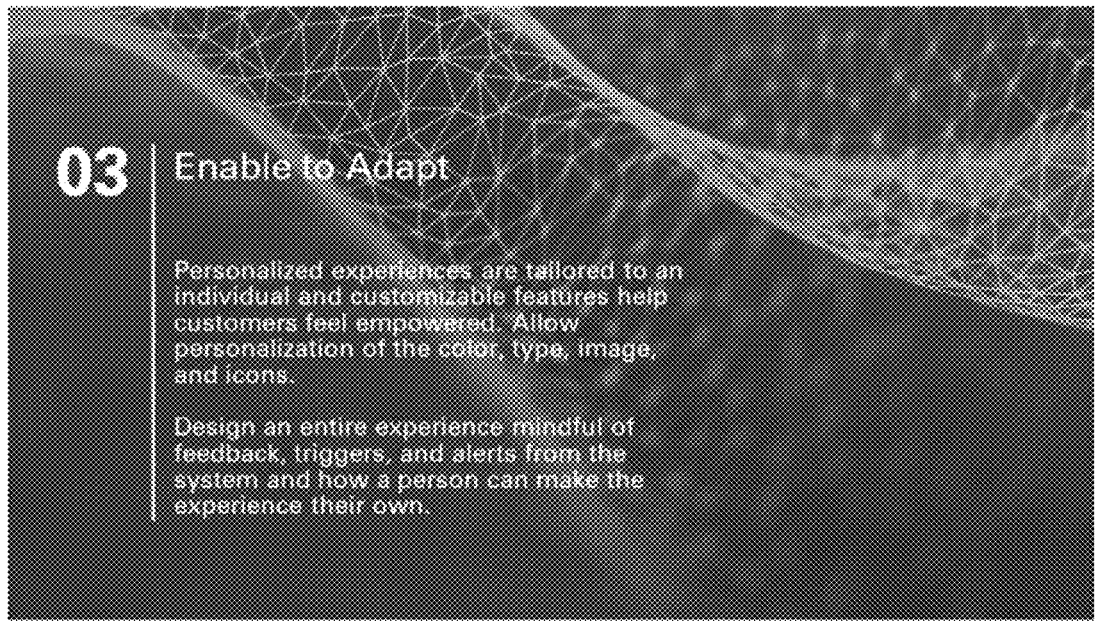

The segmentation module 410 also detects three further segments based on transition points (e.g., bullets or numbering). As a result, the second slide includes the segmented text for the first bullet point, as shown in FIG. 8C. Similarly, the third slide includes the segmented text for the second bullet point, as shown in FIG. 8D and the fourth slide includes the segmented text from the third bullet point, as shown in FIG. 8E. The placement of the segmented text on each slide is positioned in a different location between slides to provide some visual variation.

The candidate template used to generate the slides of FIG. 8B to FIG. 8E is selected based on, for example, user preferences, number of slides needed, and amount of segmented text to be included on each slide. Furthermore, the candidate ranker 416 determines that the candidate template used to generate these slide is highly aesthetically appealing to users (e.g., based on placement/location of the segmented text, use of bullets, different font sizes for the different portions of the segmented text).

Figure 9A:
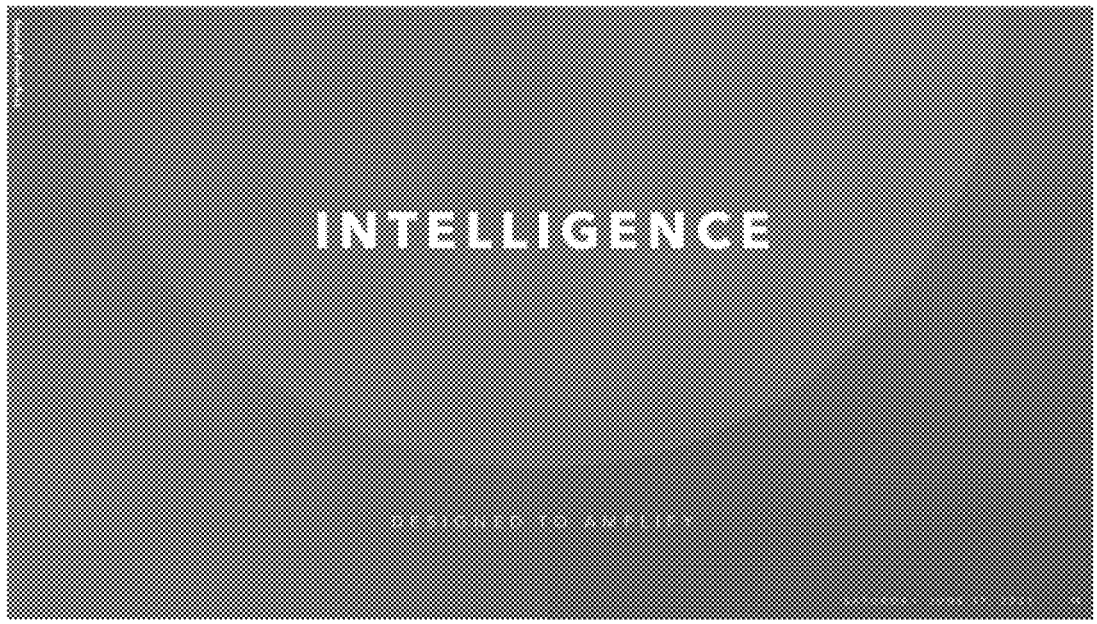
FIG. 9A-FIG. 9D illustrate example multiple segments creates from an overloaded text document using a template generated from a blueprint family, according to some example embodiments.
Figure 9B:
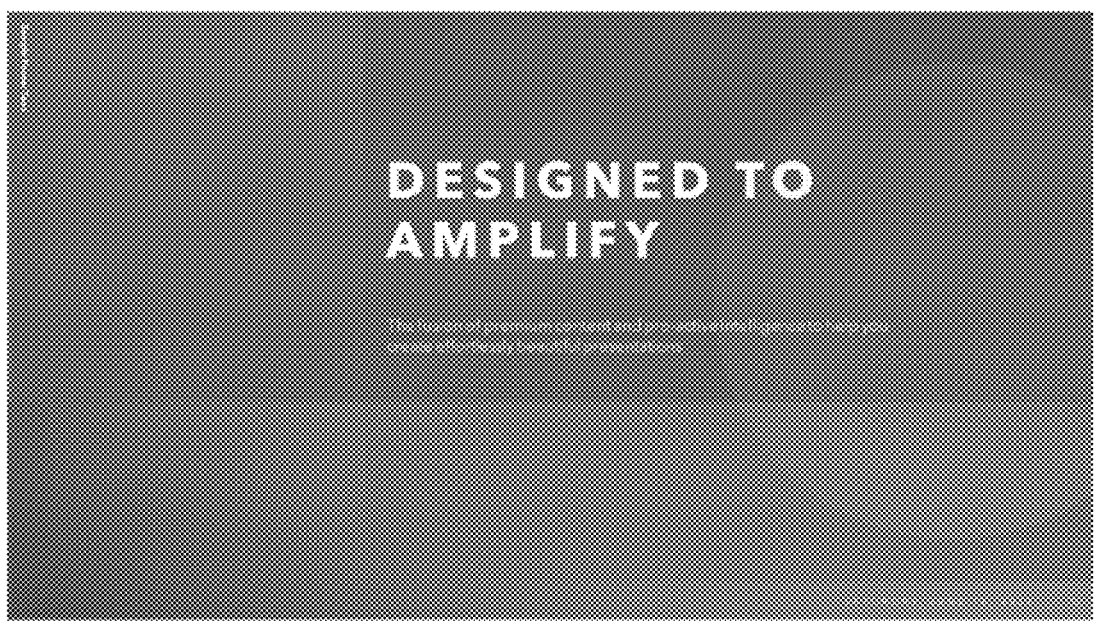
Figure 9C:
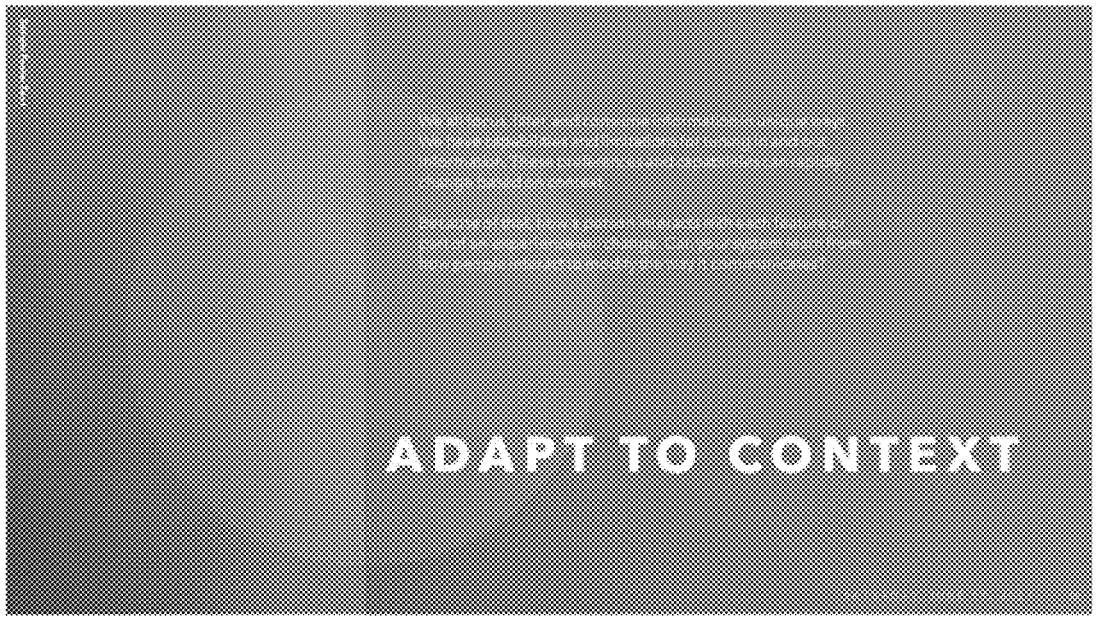
Figure 9D:

FIG. 9A-FIG. 9D illustrate example multiple segments generated from an overloaded text document using a candidate template generated from a blueprint family, according to some example embodiments. In the example of FIG. 9A-FIG. 9D, the same overloaded document 800 shown in FIG. 8A is segmented into multiple slides. The subset of the blueprint family is applied to the segmented text which results in a title slide shown in FIG. 9A. The first bullet point is displayed as shown in FIG. 9B, with a subheader ("designed to amplify") shown above information from a bullet point. Moving on to the next slide, FIG. 9C now shows a next subheader ("adapt to context") displayed below information in its corresponding bullet points. Finally, the last slide shown in FIG. 9D shows the subheader positioned above the information from its bullet points. Further still, this candidate template moves the location of the box from close to center (in FIG. 9A and FIG. 9B), to the right (FIG. 9C), and to the left (in FIG. 9D) to provide some visual variation.

Figure 10:
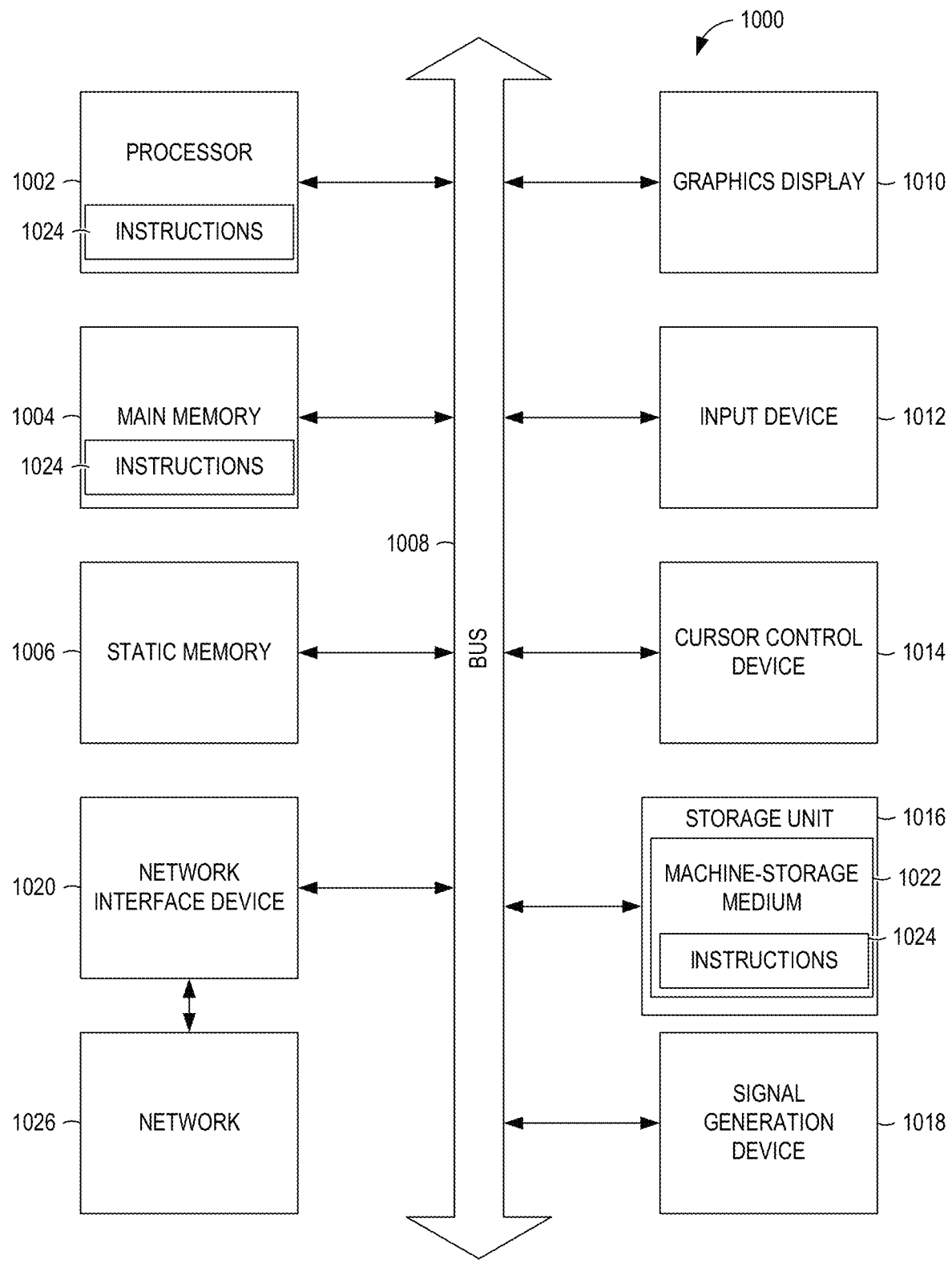
FIG. 10 is a block diagram illustrating components of a machine, according to some example embodiments, able to read instructions from a machine-storage medium and perform any one or more of the methodologies discussed herein.

FIG. 10 illustrates components of a machine 1000, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 10 shows a diagrammatic representation of the machine 1000 in the example form of a computer device (e.g., a computer) and within which instructions 1024 (e.g., software, a program, an application, an applet, an app, or other executable code) for causing the machine 1000 to perform any one or more of the methodologies discussed herein may be executed, in whole or in part.

For example, the instructions 1024 may cause the machine 1000 to execute the block and flow diagrams of FIGS. 5-7. In one embodiment, the instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, or a cathode ray tube (CRT), or any other display capable of displaying graphics or video). The machine 1000 may also include an input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes a machine-storage medium 1022 (e.g., a tangible machine-storage medium) on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered as machine-readable media (e.g., tangible and non-transitory machine-readable media). The instructions 1024 may be transmitted or received over a network 1026 via the network interface device 1020.

In some example embodiments, the machine 1000 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1004, 1006, and/or memory of the processor(s) 1002 and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1022 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for transforming an overloaded text document into a plurality of pages. The method comprises accessing the text document; analyzing, by one or more hardware processors, the text document to identify segmentation data, the segmentation data indicating a plurality of segments derived from the text document; accessing a plurality of candidate templates, each candidate template comprising a plurality of pages having a different background element that shares a common theme; ranking the plurality of candidate templates based on at least the segmentation data; generating multiple presentation pages for each of a predetermined number of top ranked candidate templates by incorporating each of the plurality of segments into a corresponding page of the plurality of pages for each of the top ranked candidate templates; and causing display of the multiple presentation pages for each of the top ranked candidate templates as a recommendation, the causing display including causing display of a morph transition between each page of the multiple presentation pages.

In example 2, the subject matter of example 1 can optionally include wherein the plurality of pages comprises a plurality of slides.

In example 3, the subject matter of any of examples 1-2 can optionally include, prior to the accessing and the analyzing, determining whether to trigger a process to transform the overloaded text document into the plurality of pages.

In example 4, the subject matter of any of examples 1-3 can optionally include generating a candidate template.

In example 5, the subject matter of any of examples 1-4 can optionally include wherein generating the candidate template comprises selecting a large image; and based on design constraints, positioning cropping boxes on different locations of the large image, each cropping box corresponding to a background of a page of the plurality of pages.

In example 6, the subject matter of any of examples 1-5 can optionally include wherein generating the candidate template comprises selecting a blueprint family; and based on design constraints, selecting a subset of the blueprint family and applying an order to the subset, the subset of the blueprint corresponding to different backgrounds of the plurality of pages.

In example 7, the subject matter of any of examples 1-6 can optionally include wherein generating the candidate template comprises applying a morph effect to the candidate template that causes a smooth transition between the plurality of pages.

In example 8, the subject matter of any of examples 1-7 can optionally include wherein generating the candidate template comprises applying a color adjustment to cause a color variation for the candidate template.

In example 9, the subject matter of any of examples 1-8 can optionally include wherein generating the candidate template comprises ranking a plurality of candidate templates using an aesthetic assessment model.

In example 10, the subject matter of any of examples 1-9 can optionally include receiving an indication of acceptance or rejection of the recommendation; and using the indication as feedback for adjusting user preferences and retraining one or more machine-trained models used to generate or rank the plurality of candidate templates.

Example 11 is a system to transform an overloaded text document into a plurality of pages. The system comprises one or more hardware processors and a memory storing instructions that, when executed by the one or more hardware processors, cause the one or more hardware processors to perform operations comprising analyzing the text document to identify segmentation data, the segmentation data indicating a plurality of segments derived from the text document; accessing a plurality of candidate templates, each candidate template comprising a plurality of pages having a different background element that shares a common theme; ranking the plurality of candidate templates based on at least the segmentation data; generating multiple presentation pages for each of a predetermined number of top ranked candidate templates by incorporating each of the plurality of segments into a corresponding page of the plurality of pages for each of the top ranked candidate templates; and causing display of the multiple presentation pages for each of the top ranked candidate templates as a recommendation, the causing display including causing display of a morph transition between each page of the multiple presentation pages.

In example 12, the subject matter of example 11 can optionally include wherein the operations further comprise, prior to the accessing and the analyzing, determining whether to trigger a process to transform the overloaded text document into the plurality of pages.

In example 13, the subject matter of any of examples 11-13 can optionally include wherein the operations further comprise generating a candidate template.

In example 14, the subject matter of any of examples 11-13 can optionally include wherein generating the candidate template comprises selecting a large image; and based on design constraints, positioning cropping boxes on different locations of the large image, each cropping box corresponding to a background of a page of the plurality of pages.

In example 15, the subject matter of any of examples 11-14 can optionally include wherein generating the candidate template comprises selecting a blueprint family; and based on design constraints, selecting a subset of the blueprint family and applying an order to the subset, the subset of the blueprint corresponding to different backgrounds of the plurality of pages.

In example 16, the subject matter of any of examples 11-15 can optionally include wherein generating the candidate template comprises applying a morph effect to the candidate template that causes a smooth transition between the plurality of pages.

In example 17, the subject matter of any of examples 11-16 can optionally include wherein generating the candidate template comprises applying a color adjustment to cause a color variation for the candidate template.

In example 18, the subject matter of any of examples 11-17 can optionally include wherein generating the candidate template comprises ranking a plurality of candidate templates using an aesthetic assessment model.

In example 19, the subject matter of any of examples 11-18 can optionally include wherein the operations further comprise receiving an indication of acceptance or rejection of the recommendation; and using the indication as feedback for adjusting user preferences and retraining one or more machine-trained models used to generate or rank the plurality of candidate templates.

Example 20 is a computer-storage medium comprising instructions which, when executed by one or more hardware processors of a machine, cause the machine to perform operations to transform an overloaded text document into a plurality of pages. The operations comprising accessing a text document; analyzing the text document to identify segmentation data, the segmentation data indicating a plurality of segments derived from the text document; accessing a plurality of candidate templates, each candidate template comprising a plurality of pages having a different background element that shares a common theme; ranking the plurality of candidate templates based on at least the segmentation data; generating multiple presentation pages for each of a predetermined number of top ranked candidate templates by incorporating each of the plurality of segments into a corresponding page of the plurality of pages for each of the top ranked candidate templates; and causing display of the multiple presentation pages for each of the top ranked candidate templates as a recommendation, the causing display including causing display of a morph transition between each page of the multiple presentation pages.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method to transform an overloaded text document into a plurality of pages, the method comprising:
    accessing the overloaded text document;
    accessing user preferences from a user profile that indicate situations when overloaded text documents are to be altered;
    determining that an amount of text on the overloaded text document transgresses a threshold that triggers a process to transform the overloaded text document into the plurality of pages;
    in response to the determining and based on the user preferences, analyzing, by one or more hardware processors, the overloaded text document to identify segmentation data, the segmentation data indicating a plurality of segments derived from the overloaded text document, each segment of the plurality of segments to be incorporated into a different page of the plurality of pages of a template that is selected based on the user preferences, number of pages needed, and an amount of text in each segment to be included on each page;
    generating the plurality of pages by incorporating each segment of the plurality of segments into a different corresponding page of the plurality of pages and providing a transition between each of the plurality of pages; and
    causing display of the plurality of pages as a recommendation.

2. The method of claim 1, wherein the template is selected based on one or more of a time of day, a day of week, a location, or a client endpoint based on the user preferences.

3. The method of claim 1, wherein the transition comprises a morph transition between each page of the plurality of pages.

4. The method of claim 1, wherein the overloaded text document comprises an overloaded slide and the generating the plurality of pages comprises generating a plurality of slides from the overloaded slide.

5. The method of claim 1, further comprising:
    receiving an indication of acceptance or rejection of the recommendation; and
    using the indication as feedback for adjusting user preferences or retraining a machine-learning model.

6. The method of claim 1, wherein the analyzing the overloaded text document to identify segmentation data comprises using a segmentation model to segment the overloaded text document into smaller parts and identify a number of segments that the overloaded text document will be split into.

7. The method of claim 1, wherein the analyzing the overloaded text document to identify segmentation data comprises analyzing the overloaded text document for structure signals, the structure signals including one or more of numbering, end of a paragraph, bullet points, a new line, or a period symbol.

8. The method of claim 1, further comprising using a summarization model to extract key parts from the overloaded text document for use as a title for each segment.

9. The method of claim 1, further comprising:
    accessing a plurality of candidate templates, each candidate template comprising a plurality of template pages having a different background element that shares a common theme; and
    ranking the plurality of candidate templates based, in part, on the segmentation data to determine top ranked candidate templates.

10. The method of claim 9, wherein:
    the generating the plurality of pages comprises generating top candidate page sets using a predetermined number of the top ranked candidate templates by incorporating each segment of the plurality of segments into a different corresponding page of the plurality of template pages for each of the top ranked candidate templates; and
    the causing display of the plurality of pages comprises causing display of the top candidate page sets as the recommendation.

11. The method of claim 1, further comprising generating a candidate template, the generating the candidate template comprises:
    selecting a large image; and
    based on design constraints, positioning cropping boxes on different locations of the large image, each location of each cropping box on the image resulting in a different background of a page of the plurality of pages.

12. The method of claim 1, further comprising generating a candidate template, the generating the candidate template comprises:
    selecting a blueprint family; and
    based on design constraints, selecting a subset of the blueprint family and applying an order to the subset of the blueprint family, the subset of the blueprint family corresponding to different backgrounds of the plurality of pages.

13. A system to transform an overloaded text document into a plurality of pages, the system comprising:
    one or more hardware processors; and
    a memory storing instructions that, when executed by the one or more hardware processors, cause the one or more hardware processors to perform operations comprising:
        accessing the overloaded text document;
        accessing user preferences from a user profile that indicate situations when overloaded text documents are to be altered;
        determining that an amount of text on the overloaded text document transgresses a threshold that triggers a process to transform the overloaded text document into the plurality of pages;
        in response to the determining and based on the user preferences, analyzing, by one or more hardware processors, the overloaded text document to identify segmentation data, the segmentation data indicating a plurality of segments derived from the overloaded text document, each segment of the plurality of segments to be incorporated into a different page of the plurality of pages of a template that is selected based on the user preferences, number of pages needed, and an amount of text in each segment to be included on each page;
        generating the plurality of pages by incorporating each segment of the plurality of segments into a different corresponding page of the plurality of pages and providing a transition between each of the plurality of pages; and causing display of the plurality of pages as a recommendation.

14. The system of claim 13, wherein the template is selected based on one or more of a time of day, a day of week, a location, or a client endpoint based on the user preferences.

15. The system of claim 13, wherein the transition comprises a morph transition between each page of the plurality of pages.

16. The system of claim 13, wherein the overloaded text document comprises an overloaded slide and the generating the plurality of pages comprises generating a plurality of slides from the overloaded slide.

17. The system of claim 13, wherein the operations further comprise:

receiving an indication of acceptance or rejection of the recommendation; and using the indication as feedback for adjusting user preferences or retraining a machine-learning model.

18. The system of claim 13, wherein the analyzing the overloaded text document to identify segmentation data comprises using a segmentation model to segment the overloaded text document into smaller parts and identify a number of segments that the overloaded text document will be split into.

19. The system of claim 13, wherein the analyzing the overloaded text document to identify segmentation data comprises determining context associated with the overloaded text document to identify a change in context, the change in context indicating a different segment.

20. A computer-storage medium comprising instructions which, when executed by one or more hardware processors of a machine, cause the machine to perform operations comprising:

accessing the overloaded text document;

accessing user preferences from a user profile that indicate situations when overloaded text documents are to be altered;

determining that an amount of text on the overloaded text document transgresses a threshold that triggers a process to transform the overloaded text document into the plurality of pages;

in response to the determining and based on the user preferences, analyzing, by one or more hardware processors, the overloaded text document to identify segmentation data, the segmentation data indicating a plurality of segments derived from the overloaded text document, each segment of the plurality of segments to be incorporated into a different page of the plurality of pages of a template that is selected based on the user preferences, number of pages needed, and an amount of text in each segment to be included on each page;

generating the plurality of pages by incorporating each segment of the plurality of segments into a different corresponding page of the plurality of pages and providing a transition between each of the plurality of pages; and causing display of the plurality of pages as a recommendation.

* * * * *